United States Patent [19]
Gievers

[11] 3,981,587
[45] Sept. 21, 1976

[54] MONITORING RELATIVE DISPLACEMENT BETWEEN TWO DEVICES

[75] Inventor: John G. Gievers, Rochester, Mich.

[73] Assignee: Chrysler Corporation, Highland Park, Mich.

[22] Filed: Dec. 17, 1962

[21] Appl. No.: 245,320

[52] U.S. Cl. ............................. 356/152; 356/114; 250/225
[51] Int. Cl. .......................................... G01b 11/26
[58] Field of Search ........... 250/225, 199, 220, 201; 356/152, 114

[56] References Cited
UNITED STATES PATENTS 2,976,764  3/1961  Hyde et al. ...................... 356/116
2,998,746  9/1961  Gievers ............................ 356/152

OTHER PUBLICATIONS

Takasaki—Journal of the Optical Society of America—vol. 51, No. 10, Oct. 1961, pp. 1146 and 1147.
King et al.—Journal of Scientific Instruments—vol. 38, May 1961, pp. 207 and 208.
Takasaki—Journal of the Optical Society of America—vol. 51, No. 4, Apr. 1961, pp. 462 and 463.
Takasaki—Journal of the Optical Society of America—vol. 52, No. 6, June 1962, pp. 718 and 719.

Primary Examiner—Maynard R. Wilbur
Assistant Examiner—S. C. Buczinski
Attorney, Agent, or Firm—Talburtt & Baldwin

EXEMPLARY CLAIM

32. An apparatus for monitoring the relative position between two points at one of which a light source is positioned, said apparatus comprising
means for polarizing and modulating the light from said light source into a polarized and modulated beam,
a transducer which has a sensitive axis about which it may be rotated to change the birefringent action thereof from an initial birefringent position,
said transducer being substantially insensitive to rotations about any other coplanar axis,
means for positioning said transducer at said second point in the path of said light beam for rotation about its sensitive axis and with its sensitive axis parallel to the axis about which relative movement is to be monitored,
means for analyzing said light beam after passage through said transducer for changes in polarity thereof due to rotation of the transducer about its sensitive axis relative to the beam,
a second transducer positioned in the path of the light beam with its sensitive axis at an angle to the sensitive axis of the first transducer,
and second analyzer means for analyzing the change in polarity of said light beam due to the rotation of said second transducer.

36 Claims, 10 Drawing Figures

RECEIVER

TRANSMITTER

ONE MODULATION CYCLE

MONITORING RELATIVE DISPLACEMENT BETWEEN TWO DEVICES

This invention relates to monitoring the relative displacement between two devices about a plurality of axes as, for example, the relative displacement of a stabilized platform relative to a reference platform.

It has heretofore been suggested that electro-optical autocollimators be utilized in order to monitor and align the position of one device such as a stabilized platform with reference to another device such as a reference platform. Such systems depend for proper functioning on a precise determination of the position of an optical image. As the distance between the devices increases, the accuracy and angular range are substantially reduced. It is therefore desirable to provide an electro-optical system which is not dependent upon an optical image and is therefore not subject to the disadvantages of the autocollimator type system.

It is an object of this invention to provide an electro-optical method and apparatus for monitoring and aligning the position of one device with respect to another reference device.

It is a further object of the invention to provide such a method and apparatus which can be used for monitoring the relative displacement of one device with respect to another reference device about a plurality of axes.

It is a further object of the invention to provide such a method and apparatus which overcomes the disadvantages inherent in an electro-optical autocollimator type system.

It is a further object of the invention to provide a method and apparatus for monitoring the relative displacement of a light source relative to a reference device about a plurality of axes.

Basically, the invention comprises a transmitter fixedly positioned on one device for directing a polarized and modulated light beam toward another device the position of which is to be monitored. A receiver is fixed on the other device and coprises a transducer in the path of the polarized and modulated light beam. The transducer is of the type which modifies the polarized and modulated light beam, the amount of birefringence depending upon the angle which the transducer is rotated about its sensitive axis from an initial position and wherein the transducer is substantially insensitive to rotations about any other coplanar axis. The transducer is positioned so that its sensitive axis is parallel to the axis about which relative displacement is to be monitored. By such an arrangement and by the use of a plurality of transducers with suitable analysis of the light beam after passage through the transducers, it is possible to create a signal when the polarization of the light through the transducers has been changed because of the birefringent action of the transducer due to any rotation of the transducer about its sensitive axis. This signal can be used to measure the degree of displacement or to control servo-motors for restoring the two devices to their original relative positions.

Figure 1:
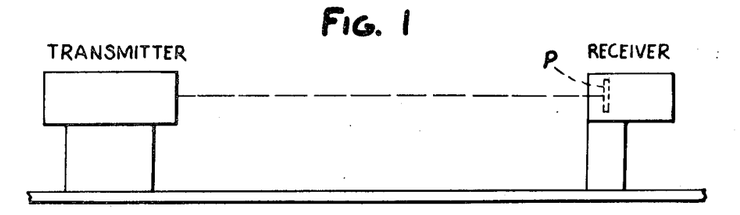
FIGS. 1, 2 and 3 are diagrammatic showings of monitoring systems embodying the invention.
Figure 2:
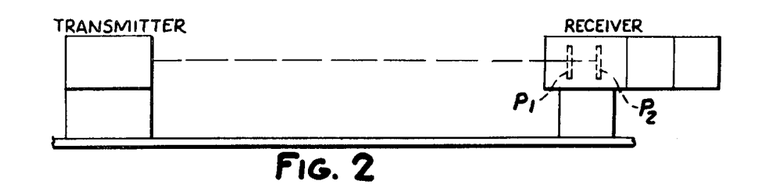
Figure 3:
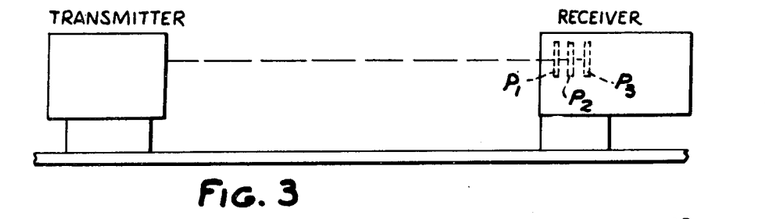

Referring to FIG. 1, the monitoring system comprises a transmitter which is adapted to be rigidly fixed to one device and a receiver which is adapted to be rigidly fixed to another device, the relative displacement between the two devices being monitored by the system. The transmitter directs a beam of polarized and modulated light to the receiver. A transducer plate P is positioned in the receiver, as presently described. The transducer plate P is of a type such that it has a sensitive axis about which a rotation will cause birefringent action on the light beam passing therethrough and which is substantially insensitive to rotation about other coplanar axes. By mounting the transducer plate P in such a manner that its sensitive axis is parallel to the axis about which displacement of the receiver relative to the transmitter is to be monitored, the transducer will cause a birefringence depending upon the angle which the transducer is rotated about its sensitive axis from an initial position. By analyzing the light beam after it has passed through the transducer P, a signal can be produced which indicates the relative displacement of the receiver relative to the transmitter about the sensitive axis of the transducer. In a similar fashion as shown in FIG. 2, the use two transducer plates $P_1$, $P_2$ permits monitoring the relative displacement of the receiver with respect to the transmitter about two axes. In a similar fashion, as shown in FIG. 3, the use of three transducer plates $P_1$, $P_2$, $P_3$ permits monitoring the relative displacement of the receiver with respect to the transmitter about three axes.

Figure 4:
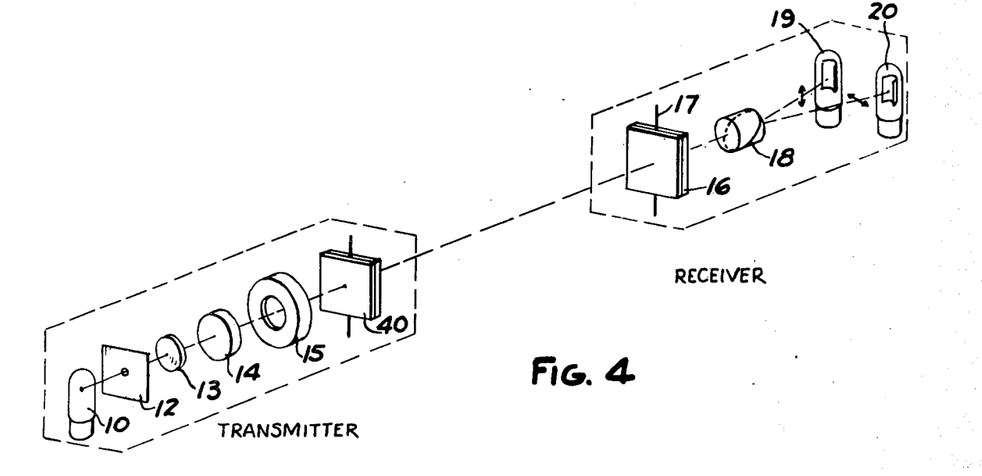
FIG. 4 is a diagrammatic perspective view of a monitoring system for monitoring the relative displacement about a single lateral axis.
Figure 4A:
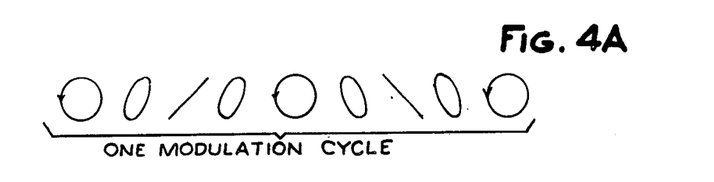
FIG. 4A is a diagrammatic view of the modulated and polarized light beam used in the apparatus.

The system shown in FIG. 1 is more completely understood with reference to FIG. 4 which is a diagrammatic perspective view of the transmitter and receiver. As shown in FIG. 4, the transmitter, which is rigidly fixed on one reference device, comprises a light source 10 which emits light that passes through an aperture in a plate 12, a collimating lens 13 and a polarizer 14 which circularly polarizes the light. The circularly polarized light then passes through a light modulator 15 in the transmitter. Light modulator 15 is of well-known type such as the Pockel cell to which a voltage is applied to modulate the polarized light. By applying a sine wave of voltage to the light modulator 15, as is well known, the polarized light can be continuously changed as illustrated in FIG. 4A. As shown in FIG. 4A, the light is modulated from circularly polarized light to elliptically polarized light, to plain polarized light, back to elliptically polarized light, and to circularly polarized light twice during each modulation cycle. In the arrangement shown in FIG. 4, the transmitter is so arranged that the plain and elliptically polarized light occur at 45 degrees to the vertical.

As further shown in FIG. 4, the receiver comprises a lateral axis transducer plate 16 positioned with its sensitive axis 17 extending vertically. The transducer is of a type such that it is sensitive to rotation about its sensitive axis and relatively insensitive to rotation about other axes. A suitable lateral axis transducer is that which is known as a Savart plate described in Ann. Der Physik 49 (1840) page 292. Such a device comprises a composite of birefringent crystals so arranged that the amount of birefringement it exhibits depends upon the angle through which the transducer has been rotated about a particular axis perpendicular to the direction of propogation of the incident light. As long as the face of the transducer is perpendicular to the incident light beam, the transducer will exhibit no birefringence and the incident light will pass through unchanged. However, as the receiver and with it the transducer is rotated about the sensitive axis, the transducer exhibits increasing birefringence. The chief effect of this birefringence will be to charge the circularly polarized incident light into elliptically polarized light. Within the range of movements contemplated by the present system, the ellipticity will increase with increasing angle and the major axes of the ellipses formed will be either vertical or horizontal depending upon the direction of rotation.

After passing through the transducer 16, the light beam is then passed to an analyzer A, which includes a Wollaston prism 18 and a pair of photocells 19, 20. The Wollaston prism 18 is so oriented that it polarizes the light beam passing therethrough into two beams which are oriented in a vertical and horizontal direction and are polarized in vertical and horizontal planes. The two beams then pass to photocells 19, 20, respectively. The electrical currents created in the photocells 19, 20 by the two beams can then be compared. The manner in which this may be achieved is shown in the block diagram in FIG. 5 wherein the light analyzer which includes the photocells 19, 20 is shown as passing the current to a differential amplifier. The difference is then transmitted to a meter, recorder or other read-out device 21.

As long as the face of the transducer 16 is perpendicular to the incident light beam, the transducer will exhibit no birefringence and the incident light will pass through unchanged. The read-out device 21 will then register no reading. As the receiver and with it the transducer 16 is rotated about the sensitive axis, namely, the vertical axis in FIG. 4, the transducer 16 exhibits increasing birefringence. The chief effect of this birefringence will be to change the circularly polarized incident light into elliptically polarized light. Within the limits of movement contemplated by the present system, the ellipticity will increase with increasing angle and the major axes of the ellipses formed will be either elliptical or horizontal depending upon the direction of rotation. The Wollaston prism will then divide the light so that unequal amounts fall on the two photocells 19, 20. As a result, there will be a net output current from the differential amplifier. Since the circularly polarized light occurs twice a cycle, the output current will have twice the frequency of the voltage applied to the light modulator 15. The amplitude of the current will be a function of the amount of rotation of the receiver and transducer 16 about the sensitive axis of the transducer. This current will therefore be a measure of this rotation and can be read out on the read-out device 21. Alternatively, the electrical signal can be fed back through a servo motor to bring the two devices back into alignment which will be indicated by a zero signal on the read-out device 21.

Figure 5:
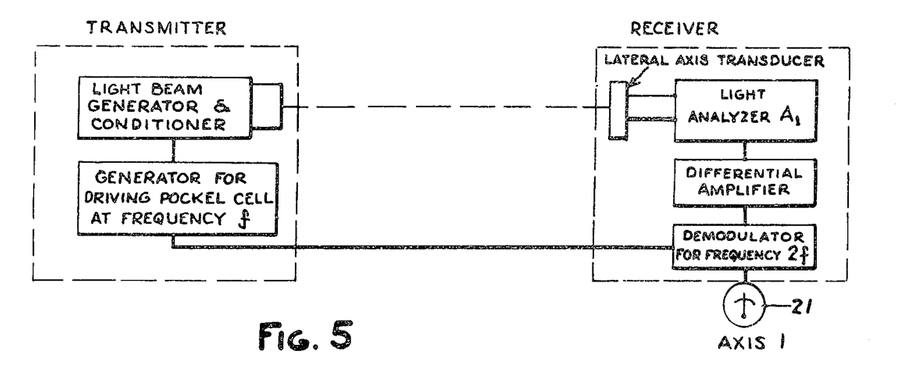
FIG. 5 is a block diagram of the apparatus shown in FIG. 4.
Figures 9, 10:
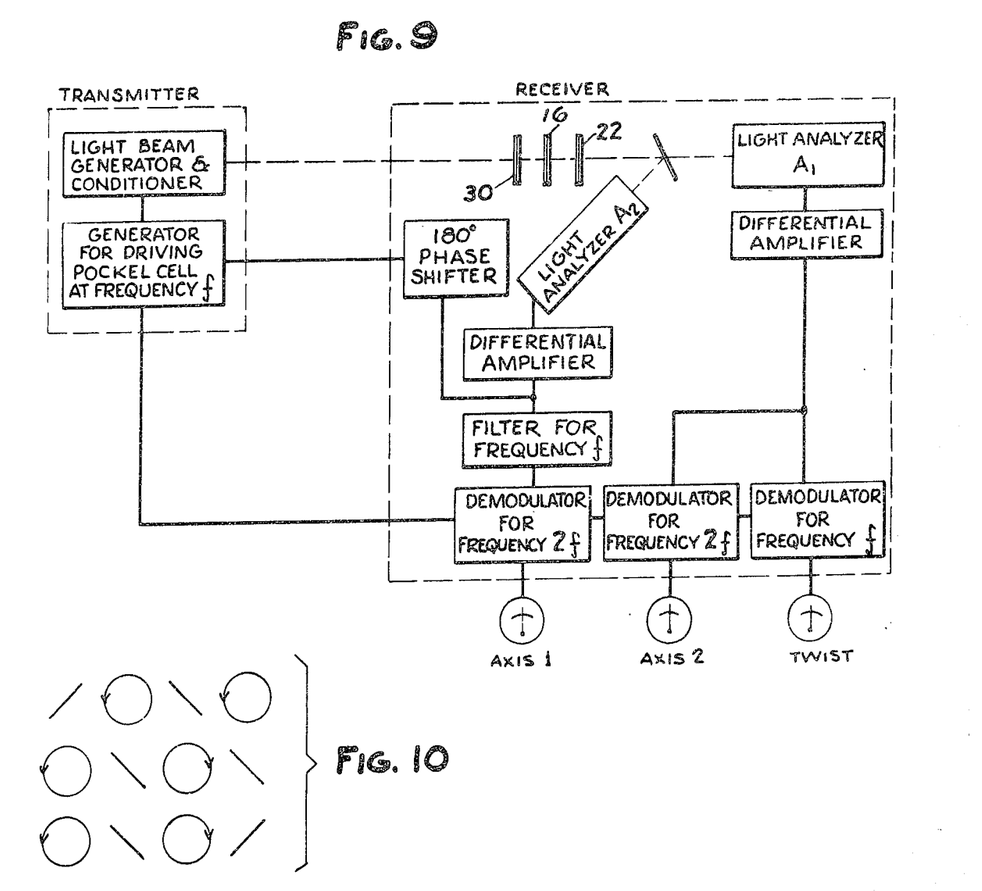
FIG. 9 is a block diagram for monitoring relative displacement about two lateral axes and rotation about the axis of the light beam.
FIG. 10 is a diagrammatic view of other modulated and polarized light beams which may be used.

It can be appreciated that the typical modulation cycle shown in FIG. 5 is merely representative and other modulation cycles can be used. Thus, instead of providing a polarizer 14 which circularly polarizes light, a polarizer may be provided which plane polarizes the light and the light modulator 15 will modulate the light from plane polarized light to elliptically polarized light, to circularly polarized light, back to elliptically polarized light, and to plane polarized light twice during each modulation cycle. Other modulation cycles are possible, such as shown in FIG. 10, as will be readily apparent to those skilled in the art.

Figure 6:
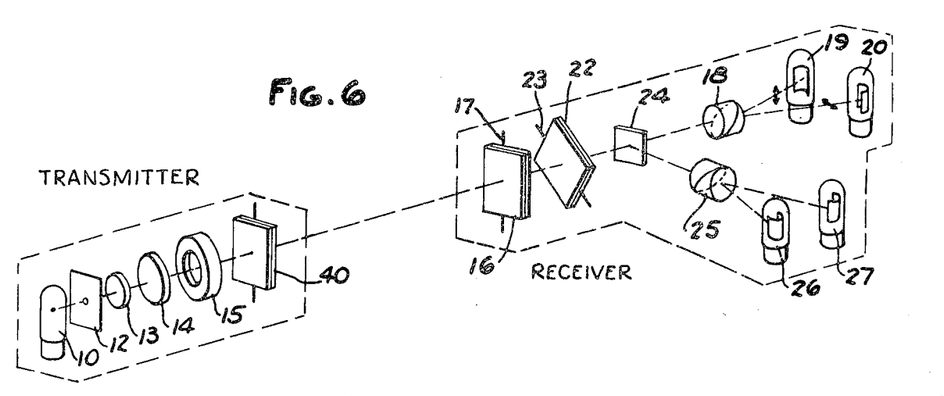
FIG. 6 is a diagrammatic perspective view showing an apparatus for monitoring the relative displacement about two lateral axes.
Figure 7:
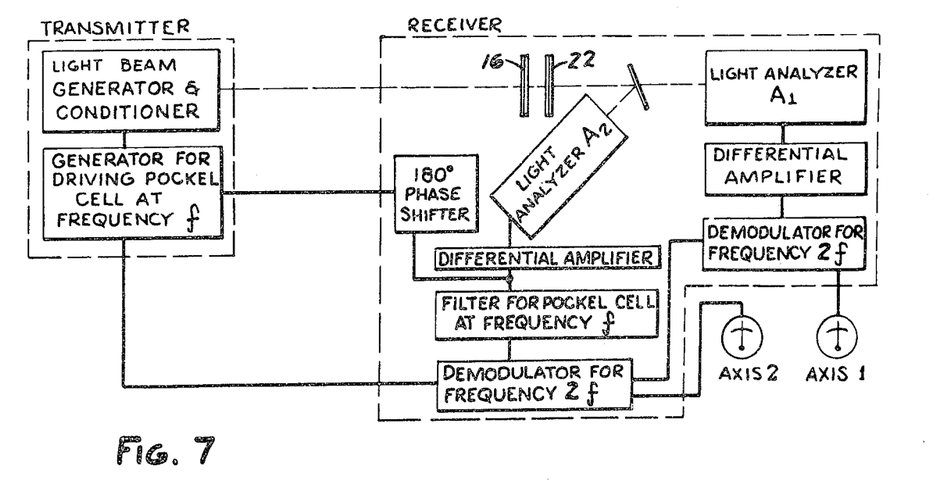
FIG. 7 is a block diagram of the apparatus shown in FIG. 6.

A monitoring system for monitoring relative displacement of the receiver about two lateral axes is shown in FIGS. 6 and 7. This system is identical to that shown in FIGS. 4 and 5 with the addition of a second lateral axis transducer plate 22 positioned with its sensitive axis 23 at an angle to the sensitive axis 17 of plate 16, herein as shown as 45 degrees to the vertical. In addition, a beam splitter 24 is inserted in the path of the light beam after it has passed through the transducers 16, 22. This divides the light beam into two parts one of which passes to the analyzer $A_1$ including the Wollaston prism 18 and photocells 19, 20 and the other beam passes to an added analyzer including a Wollaston prism 25 and photocells 26, 27. The Wollaston prism 25 is so oriented that it passes light polarized at an angle of 45 degrees to the light passed by Wollaston prism 18, that is, 45 degrees to the vertical.

The manner in which the parts are electrically connected is shown in FIG. 7 wherein a differential amplifier is provided in association with the light analyzer $A_2$ and a filter and demodulator are provided in association therewith, as presently described.

With the arrangement shown in FIGS. 6 and 7, each transducer 16, 22 when rotated about its sensitive axis will change the circularly polarized light to elliptically polarized light. The ellipse generated by the transducer 16, which has its sensitive axis extending vertically, will cause a vertically or horizontally oriented ellipse to be generated. This will cause an output at the analyzer $A_1$, which has its Wollaston prism sensitive to vertical and horizontal planes of polarization, but no output on the other analyzer $A_2$ which is insensitive to ellipses so oriented. On the other hand, the second analyzer $A_2$ will register an output when the second transducer 22 is rotated about its sensitive axis 23, which is oriented 45° to the vertical, but will register no output on the first analyzer $A_1$. Thus, the device is capable of detecting rotation about two different axes both in the same plane simultaneously. As with the single lateral axis system shown in FIGS. 4 and 5, the output from each analyzer passes to a differential amplifier and consists of a current which has a frequency of twice the frequency of the voltage applied to the light modulator 15 and an amplitude which is a function of the rotation about the sensitive axis of the specific lateral axis transducer which corresponds to the particular analyzer. Each output can be read out or fed back to servo motors which can return the receiver to alignment about both lateral axes simultaneously. This will align the planes of the transducer faces perpendicular to the light beam.

If the light modulation cycle is of the type illustrated in FIG. 4A, there will be a continuous signal on the analyzer whose Wollaston prism is oriented at 45 degrees to the vertical axis. This signal will be due to the plane and elliptically polarized light generated by the light modulator 15. However, the signal will occur at the frequency of the voltage applied to the light modulator and therefore can be separated from the true signal by using a bucking or countersignal provided by the demodulator and filter.

Figure 8:
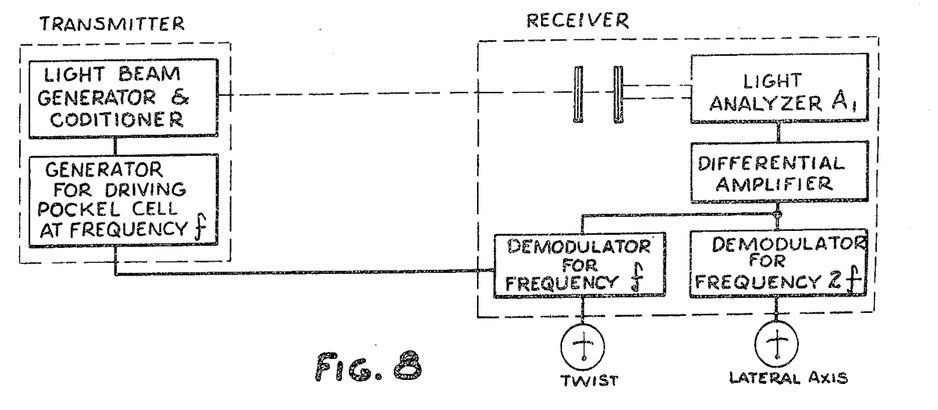
FIG. 8 is a block diagram of an apparatus for monitoring the relative displacement about a lateral axis and about the axis of the light beam.

The systems shown in FIGS. 7 and 8 can be modified to monitor relative displacement or rotation about the axis of the light beam as shown in FIG. 9 by the addition of a third transducer 30 which comprises a device having the properties of a half-wave plate for the mean effective color of the particular light beam used. Half-wave plate 30 is so arranged that its axis is oriented 45° to the planes of polarization produced during the modulation cycle (FIG. 4A). When so positioned, the transducer plate 30 has no effect on the output. If, however, the transducer plate 30 is rotated about the axis of the light beam, an output will appear. This output can be analyzed by an analyzer $A_1$ by the addition of a demodulator for the basic frequency. Rotation of the half-wave plate around the axis of projection of the light beam will cause the plane polarized light which occurs during the modulation cycle to be rotated through twice the angle between the plane of polarization and the half-wave plate axis. As a result, the planes of polarization of the light incident on the Wollaston prism 18 of analyzer $A_1$ will no longer be oriented so that the intensities on each photocell are equal. Instead, more light will be directed to one photocell than the other. One-half cycle later, when the plane originally oriented at 90° to the first plane enters the Wollaston prism 18, it will be divided so that the photocell which received more light than the first plane now receives less. As a result, an alternating current will be generated at the differential amplifier. The magnitude of this current will be a function of the angle of rotation around the light beam and it will be a frequency equal to the frequency of a voltage supplied to the light modulator 15.

By suitable demodulators, the light modulator frequency $f$ is separated from the harmonic $2f$. Thus, both twist and one lateral axis information is obtained simultaneously from the same device. The amount of rotation about the lateral axis will be indicated by the amplitude of the harmonic of the light modulators $2f$ and the amount of twist will be indicated by the amplitude of the light modulator frequency itself $f$. These signals are read out or fed back through servo motors to eliminate both signals and bring the device back into alignment.

Instead of utilizing a half-wave plate as a twist transducer, a Savart plate, such as plates 16 and 22, can be used and rotated about its sensitive axis until it exhibits one-half wave of relative retardation. The Savart plate then effectively becomes a half-wave plate transducer to sense both twist as well as movement about one lateral axis. The two lateral axis systems shown in FIGS. 6 and 7 can be modified into a three axis system by addition of a half-wave plate with its optic axis oriented at 45° to the sensitive axis of the transducer 16, or, alternatively, the transducer 16 may be rotated about its sensitive axis until it exhibits half wave of retardation. The transducer 16 then becomes a twist and lateral axis transducer. At the same time, the transducer 22 is used as a second lateral axis transducer. As the receiver with the transducers mounted thereon is rotated, any rotation around the light beam will show up as a signal at the frequency of the light modulator at the analyzer $A_1$. Any rotation about the sensitive axis of transducer plate 16 will show up as a signal at twice the frequency of the light modulator 15 at analyzer $A_1$. Any rotation about the sensitive axis of the transducer 22 will show up as a signal at twice the frequency of the light modulator 15 at analyzer $A_2$. As in the previously described systems, suitable demodulators can be used to separate the signals which can then be read out or fed back to servo motors to keep the devices in alignment in all three axes simultaneously.

Although the system has been described in connection with the modulation cycle shown in FIG. 4A and in the upper series shown in FIG. 10, other modulation cycles can be used as will be readily apparent to persons skilled in the art in the light of the present disclosure. Thus, if the middle cycle shown in FIG. 10 were used, the fundamental frequency would be used for monitoring lateral displacement and twice the fundamental frequency would be utilized for monitoring twist or rotation of the beam relative to the transducer. If the lower modulation cycle shown in FIG. 10 were used, the fundamental frequency would be used for monitoring both lateral displacement and twist or rotation with the readings being taken at different time intervals.

Appropriate filters and demodulators would be used in connection with such cycles as will be apparent in the light of the above description.

Although the invention has been described in connection with an artificial light source, it can be appreciated that the invention can also be used in connection with a natural light source such as a star and the like in order to monitor the angle that the star makes with the transducer.

In the cases where the invention is used at long distances, the tendency of the light to diverge may introduce minor errors which can be obviated by providing a compensating transducer such as an additional Savart plate 40 on the transmitter as shown in FIG. 4 between the light modulator 15 and the transducer plate 16. The compensating transducer 40 is oriented with its sensitive axis parallel to the axis of the transducer plate 16 but 180 degrees relative thereto. This eliminates any birefringence which might occur because of the light not being collimated.

The invention as described is particularly adaptable for monitoring and aligning the platforms of stabilizing gyroscopes or the like but may also be used for monitoring the positions of any two devices.

It can thus be seen that there has been provided a method and apparatus for monitoring the relative position of two devices which does not rely on a determination of the precise position of an optical image and therefore obviates the disadvantages inherent in prior electro-optical autocollimator systems.

I claim:

1. The method of monitoring the relative displacement of two points wherein a light source is positioned at one point which comprises
    polarizing and modulating a light beam from said light source into periodically successive circular and plane polarized light,
    positioning a lateral axis transducer at the other said point in the path of the polarized and modulated light beam so that its sensitive axis is generally perpendicular to the path of the light beam and parallel to the axis about which relative movement is to be monitored, said transducer being of the type which will cause birefringent action on a light beam passing therethrough depending upon the angle which the transducer is rotated about a sensitive axis from an initial position and wherein said transducer is substantially insensitive to rotations about any other coplanar axis, analyzing the light beam after passage through the transducer, and creating a signal when the polarity of the light through the transducer has been changed because of the birefringent action of the transducer due to any rotation of the transducer about its sensitive axis relative to the beam.

2. The method set forth in claim 1 including the step of utilizing said signal to reposition one of said points to its original relative position relative to the other of said points.

3. The method set forth in claim 1 including the step of positioning a second matching and compensating transducer of substantially identical properties in the path of the light beam between the light source and the first mentioned transducer with its axis oriented to compensate for dispersion of the light rays.

4. The method set forth in claim 1 including positioning another lateral axis transducer plate in the path of said light beam, said transducer having substantially the same optical properties as the first transducer, said transducer having its sensitive axis extending generally perpendicular to the path of the light beam at an angle to the sensitive axis of the first mentioned transducer, analyzing the light beam after passage through said last mentioned transducer and creating a signal when the polarity of the light through said second transducer is changed by the birefringent action of the transducer due to any rotation of the second transducer about its sensitive axis relative to the beam.

5. The method set forth in claim 1 including the step of positioning a half-wave plate at a third point in the path of the light beam, and analyzing the relative rotation of said half-wave plate at said third point about the general axis of the light beam by analyzing the change in polarity of the light beam due to birefringent action of said half-wave plate.

6. The method of monitoring the relative displacement of two points wherein a light source is positioned at one point which comprises the steps of polarizing and modulating the light from said light source at a fundamental frequency wherein the light beam is successively changed from circular to plane to circularly polarized light, positioning a transducer in such a manner that its sensitive axis is generally perpendicular to the path of the light beam and parallel to the axis about which rotation of said second point is to be monitored relative to said first point, said transducer being of the type which will cause birefringent action on a light beam passing therethrough depending upon the angle which the transducer is rotated about a sensitive axis from an initial position and wherein said transducer is substantially insensitive to rotations about any other coplanar axis, analyzing said beam after passage through said transducer at the frequency of occurrence of that type of polarized light to which the transducer is sensitive for changes in birefringent action due to rotation of the transducer about its sensitive axis relative to the beam, and creating a signal when a predetermined change in the polarized light is indicated.

7. The method of monitoring the relative displacement of two points wherein a light source is positioned at one point which comprises the steps of polarizing and modulating the light from said light source at a fundamental frequency wherein the light beam is successively changed from circular to plane to circularly polarized light, positioning a transducer in such a manner that its sensitive axis is generally perpendicular to the path of the light beam and parallel to the axis of the light beam, said transducer being of the type which will cause birefringent action on a light beam passing therethrough depending upon the angle which the transducer is rotated about a sensitive axis from an initial position and wherein said transducer is substantially insensitive to rotations about any other coplanar axis, analyzing the light beam after passage through the transducer at the frequency of occurrence of that type of polarized light to which the transducer is sensitive for determining rotation of the second point about an axis parallel to the direction of the beam.

8. The method of monitoring the relative displacement of two points wherein a light source is positioned at one point which comprises the steps of polarizing and modulating the light from said light source at a fundamental frequency wherein the light beam is successively changed from circular to plane to circularly polarized light, positioning a transducer in such a manner that its sensitive axis is generally perpendicular to the path of the light beam and parallel to the axis about which rotation of said second point is to be monitored relative to said first point, said transducer being of the type which will cause birefringent action on a light beam passing therefrom depending upon the angle which the transducer is rotated about a sensitive axis from an initial position and wherein said transducer is substantially insensitive to rotations about any other coplanar axis, analyzing said beam after passage through said transducer at the frequency of occurrence of that type of polarized light to which the transducer is sensitive for changes in birefringent action due to rotation of the transducer about its sensitive axis relative to the beam, creating a signal when a predetermined change in the polarized light is indicated, analyzing the light beam after passage through the transducer at the frequency of occurrence of that type of polarized light to which the transducer is sensitive for changes in birefringent action due to relative rotation of the second point about an axis parallel to the direction of the beam.

9. The method of monitoring the relative displacement of two points wherein a light source is positioned at one point which comprises the steps of polarizing and modulating the light from said light source at a fundamental frequency wherein the light beam is successively changed from circular to plane to circularly polarized light, positioning a pair of lateral axis transducers in the path of the beam with their sensitive axes generally perpendicular to the path of said light beam and with one of the transducers having its sensitive axis at an angle to the sensitive axis of the other transducer, each said transducer being of the type that the birefringent action thereof depends upon the angle which the transducer is rotated about its sensitive axis from an initial position and being substantially insensitive to rotation about any other coplanar axis, splitting said beam after passage through said transducers into a pair of beams, analyzing one of said split beams at the frequency of occurrence of that type of polarized light to which one transducer is sensitive, creating a signal when the polarity of the light has been changed due to the birefringent action of said one transducer due to rotation thereof about its sensitive axis, analyzing the other of said beams at the frequency of occurrence of that type of polarized light to which the other transducer is sensitive, and creating a signal when the polarization of said beam has been changed due to a birefringent action of the second transducer because of rotation about its sensitive axis.

10. The method of monitoring the relative displacement of two points wherein a light source is positioned at one point which comprises the steps of polarizing and modulating the light from said light source at a fundamental frequency wherein the light beam is successively changed from circular to plane to circularly polarized light, positioning a lateral axis transducer which is sensitive to rotation about one axis only in the path of the light beam with its sensitive axis generally perpendicular to the path of the light beam, positioning a twist transducer which is sensitive to rotation about an axis parallel to the light beam only in the path of the light beam with its sensitive axis generally parallel to the axis of the light beam, analyzing the light beam after passage through said transducers at the frequency of occurrence of that type of polarized light to which the lateral axis transducer is sensitive, creating a signal when the polarized light has been modified by the action of the lateral axis transducer due to rotation of the transducer about its sensitive axis relative to the beam, analyzing said light beam after passage through the transducers at the frequency of occurrence of that type of polarized light to which the twist transducer is sensitive, and creating a signal when polarized light has been changed to rotation of the twist transducer about its sensitive axis relative to the beam.

11. The method of monitoring the relative displacement of two points wherein a light source is positioned at one point which comprises the steps of polarizing and modulating the light from said light source at a fundamental frequency wherein the light beam is successively changed from circular to plane to circularly polarized light, positioning a lateral axis transducer which is sensitive to rotation about one axis only in the path of the light beam with its sensitive axis generally perpendicular to the path of the light beam, initially positioning said lateral axis transducer by rotating about its sensitive axis such that the transducer functions at said position as a half-wave plate, analyzing the light beam after passage through said transducers at the frequency of occurrence of that type of polarized light to which the lateral axis transducer is sensitive, creating a signal when the polarized light has been modified by the action of the lateral axis transducer due to rotation of the transducer about its sensitive axis, analyzing said light beam after passage through the transducers at the frequency of occurrence of that type of polarized light to which the twist transducer is sensitive, and creating a signal when the polarized light has been changed due to rotation of the transducer about the path of the beam.

12. An apparatus for monitoring the relative position between two points at one of which a light source is positioned, said apparatus comprising means for polarizing and modulating the light from said light source into a polarized and modulated beam, a transducer which has a sensitive axis about which it may be rotated to change the birefringent action thereof from an initial birefrigent position, said transducer being substantially insensitive to rotations about any other coplanar axis, means for positioning said transducer at said second point in the path of said light beam for rotation about its sensitive axis and with its sensitive axis generally perpendicular to the path of the light beam and parallel to the axis about which relative movement is to be monitored, and means for analyzing said light beam after passage through said transducer for changes in polarity thereof due to rotation of the transducer about its sensitive axis relative to the beam.

13. The combination set forth in claim 12 wherein said transducer comprises a Savart plate.

14. The combination set forth in claim 12 wherein said analyzing means comprises a prism for dividing the beam into a pair of polarized beam portions having polarity parallel and perpendicular to the sensitive axis of the transducer and light responsive means associated with each said beam portion for determining the intensity of each beam portion.

15. The combination set forth in claim 14 including means for comparing the output of said light responsive means.

16. The combination set forth in claim 15 wherein said last-mentioned means comprises a differential amplifier.

17. The combination set forth in claim 12 including a twist transducer sensitive to rotation about an axis generally perpendicular to a plane thereof, means for mounting said twist transducer in the path of a light beam with its axis parallel to the path of the light beam and at the point the rotation of which is to be monitored.

and means for analyzing the change in polarity of the light beam due to rotation of said twist transducer.

18. The combination set forth in claim 17 including a prism for dividing the beam into two portions polarized in planes parallel and perpendicular to the sensitive axis of the twist transducer.

19. The combination set forth in claim 18 including demodulator means operable at the fundamental frequency of the modulating means.

20. The combination set forth in claim 18 including demodulator means operable at twice the fundamental frequencies of the demodulator means.

21. The method of monitoring the relative displacement of two devices which comprises
positioning a source of light which emits a light beam on one said device,
polarizing and modulating said light beam,
positioning a transducer on the other said device in the path of the polarized and modulated light beam so that its sensitive axis is generally perpendicular to the path of the light beam and parallel to the axis about which relative movement is to be monitored,
said transducer being of the type which will cause birefrigent action on a light beam passing therethrough depending upon the angle which the transducer is rotated about a sensitive axis from an initial position and wherein said transducer is substantially insensitive to rotations about any other coplanar axis,
analyzing the light beam after passage through the transducer,
and creating a signal when the polarity of the light through the transducer has been changed because of the birefringent action of the transducer due to any rotation of the transducer about its sensitive axis relative to the beam.

22. The method set forth in claim 21 including the step of utilizing said signal to reposition one of said devices to its original relative position relative to the other of said devices.

23. The method set forth in claim 21 including the step of positioning a second transducer of similar properties in the path of the light beam between the light source and the first-mentioned transducer.

24. The method set forth in claim 21 including the step of positioning a half-wave plate on said other device in the path of the light beam,
and analyzing the relative rotation of the other device about the general axis of the light beam by analyzing the change in polarity of the light beam due to birefringent action of said half-wave plate.

25. The method of monitoring the relative displacement of two devices which comprises the steps of
positioning a source of light which emits a light beam on one said device,
polarizing and modulating the light from said light source at a fundamental frequency wherein the light beam is successively changed from circular to plane to circularly polarized light,
positioning a transducer on said other device in such a manner that its sensitive axis is generally perpendicular to the path of the light beam and parallel to the axis of the light beam,
said transducer being of the type which will cause birefringent action on a light beam passing therethrough depending upon the angle which the transducer is rotated about a sensitive axis from an initial position and wherein said transducer is substantially insensitive to rotations about any other coplanar axis,
analyzing said beam after passage through said transducer at the frequency of occurrence of that type of polarized light to which the transducer is sensitive for changes in birefringent action due to rotation of the transducer about its sensitive axis,
and creating a signal when a predetermined change in the polarized light is indicated.

26. The method of monitoring the relative displacement of two points wherein a light source is positioned at one point which comprises the steps of
polarizing and modulating the light from said light source at a fundamental frequency wherein the light beam is successively changed from circular to plane to circularly polarized light,
positioning a transducer on said other device in such a manner that its sensitive axis is generally perpendicular to the path of the light beam and parallel to the axis of the light beam,
said transducer being of the type which will cause birefringent action on a light beam passing therethrough depending upon the angle which the transducer is rotated about a sensitive axis from an initial position and wherein said transducer is substantially insensitive to rotations about any other coplanar axis,
analyzing the light beam after passage through the transducer at the frequency of occurrence of that type of polarized light to which the transducer is sensitive for determining rotation of the other device about an axis parallel to the direction of the beam.

27. The method of monitoring the relative displacement of two devices which comprises the steps of
positioning a source of light which emits a light beam on one said device,
polarizing and modulating the light said light source at a fundamental frequency wherein the light beam is successively changed from circular to plane to circularly polarized light,
positioning a transducer on said other device in such a manner that its sensitive axis is generally perpendicular to the path of the light beam and parallel to the axis of the light beam,
said transducer being of the type which will cause birefringent action on a light beam passing therethrough depending upon the angle which the transducer is rotated about a sensitive axis from an initial position and wherein said transducer is substantially insensitive to rotations about any other coplanar axis,
analyzing said beam after passage through said transducer at the frequency of occurrence of that type of polarized light to which the transducer is sensitive for changes in birefringent action due to rotation of the transducer about its sensitive axis,
creating a signal when a predetermined change in the polarized light is indicated,
analyzing the light beam after passage through the transducer at the frequency of occurrence of that type of polarized light to which the transducer is sensitive for changes in birefringent action due to rotation of the other device about an axis parallel to the direction of the beam.

28. The method of monitoring the relative displacement of two devices which comprises the steps of positioning a source of light which emits a light beam on one said device, polarizing and modulating the light from said light source at a fundamental frequency wherein the light beam is successively changed from circular to plane to circularly polarized light, positioning a pair of lateral axis transducers on said other device in the path of the beam with one of the transducers having its sensitive axis at an angle to the sensitive axis of the other transducer, each said transducer being of the type that the birefringent thereof depends upon the angle which the transducer is rotated about its sensitive axis from an initial position and being substantially insensitive to rotation about any other coplanar axis, splitting said beam after passage through said transducers into a pair of beams, analyzing one of said split beams at the frequency of occurrence of that type of polarized light to which one transducer is sensitive, and creating a signal when the polarity of the light has been changed due to the birefringent action of said one transducer due to rotation thereof about its sensitive axis, analyzing the other of said beams at the frequency of occurrence of that type of polarized light to which the other transducer is sensitive, and creating a signal when the polarity of said other beam has changed due to a birefringent action of the second transducer because of rotation about its sensitive axis.

29. The method of monitoring the relative displacement of two devices which comprises the steps of positioning a source of light which emits a light beam on one said device, polarizing and modulating the light from said light source at a fundamental frequency wherein the light beam is successively changed from circular to plane to circularly polarized light, positioning a lateral axis transducer on said other device which is sensitive to rotation about one axis only in the path of the light beam with its sensitive axis generally perpendicular to the path of the light beam, positioning a twist transducer on said other device which is sensitive to rotation about an axis parallel to the light beam only in the path of the light beam with its sensitive axis generally parallel to the axis of the light beam, analyzing the light beam after passage through said transducers at the frequency of occurrence of that type of polarized light to which the lateral axis transducer is sensitive, creating a signal when the polarized light has been modified by the action of the lateral axis transducer due to rotation of the transducer about its sensitive axis, analyzing said light after passage through the transducers at the frequency of occurrence of that type of polarized light to which the twist transducer is sensitive, and creating a signal when the polarity of the polarized light beam has been changed due to rotation of the twist transducer about its sensitive axis.

30. An apparatus for monitoring the relative position between two devices, said apparatus comprising a light source, means for supporting said light source on one said device, means for polarizing and modulating the light from said light source into a polarized and modulated beam, a transducer which has a sensitive axis about which it may be rotated to change the birefringent action thereof from an initial birefringent position, said transducer being substantially insensitive to rotations about any other coplanar axis, means for positioning said transducer on said other device in the path of said light beam for rotation about its sensitive axis and with its sensitive axis generally perpendicular to the path of the light beam and parallel to the axis about which relative movement is to be monitored, and means for analyzing said light beam after passage through the transducer for changes in polarity thereof due to rotation of the transducer about its sensitive axis.

31. The combination set forth in claim 30 wherein said transducer comprises a Savart plate.

32. An apparatus for monitoring the relative position between two points at one of which a light source is positioned, said apparatus comprising means for polarizing and modulating the light from said light source into a polarized and modulated beam, a transducer which has a sensitive axis about which it may be rotated to change the birefringent action thereof from an initial birefringent position, said transducer being substantially insensitive to rotations about any other coplanar axis, means for positioning said transducer at said second point in the path of said light beam for rotation about its sensitive axis and with its sensitive axis parallel to the axis about which relative movement is to be monitored, means for analyzing said light beam after passage through said transducer for changes in polarity thereof due to rotation of the transducer about its sensitive axis relative to the beam, a second transducer positioned in the path of the light beam with its sensitive axis at an angle to the sensitive axis of the first transducer, and second analyzer means for analyzing the change in polarity of said light beam due to the rotation of said second transducer.

33. The combination set forth in claim 32 including means for splitting the beam after passage through the transducers into a first portion directed to said first analyzer means and the second portion directed to said second analyzer means.

34. The method of monitoring the relative displacement of two devices which comprises positioning a source of light which emits a light beam on one said device, polarizing and modulating said light beam, positioning a transducer on the other said device in the path of the polarized and modulated light beam so that its sensitive axis is parallel to the axis about which relative movement is to be monitored, said transducer being of the type which will cause birefringent action on a light beam passing therethrough depending upon the angle which the transducer is rotated about a sensitive axis from an initial position and wherein said transducer is substantially insensitive to rotations about any other coplanar axis, analyzing the light beam after passage through the transducer, creating a signal when the polarity of the light through the transducer has been changed because of the birefringent action of the transducer due to any rotation of the transducer about its sensitive axis relative to the beam, positioning another transducer plate in the path of said light beam, said transducer having substantially the same optical properties as the first transducer, said transducer having its sensitive axis extending generally perpendicular to the path of the light beam and at an angle to the sensitive axis of the first-mentioned transducer, analyzing the light beam after passage through said last-mentioned transducer and creating a signal when the polarity of the light through said second transducer is changed by the birefringent action of the transducer due to any rotation of the second transducer about its sensitive axis.

35. An apparatus for monitoring the relative position between two devices, said apparatus comprising
a light source,
means for supporting said light source on one said device,
means for polarizing and modulating the light from said light source into a polarized and modulated beam,
a transducer which has a sensitive axis about which it may be rotated to change the birefringent action thereof from an initial birefringent position,
said transducer being substantially insensitive to rotations about any other coplanar axis,
means for positioning said transducer on said other device in the path of said light beam for rotation about its sensitive axis and with its sensitive axis parallel to the axis about which relative movement is to be monitored,
means for analyzing said light beam after passage through the transducer for changes in polarity thereof due to rotation of the transducer about its sensitive axis,
a second transducer,
means for mounting said second transducer in the path of the light beam with its sensitive axis at an angle to the sensitive axis of the first transducer,
and second analyzer means for analyzing the change in polarity of said light beam due to the rotation of said second transducer.

36. The combination set forth in claim 35 including a twist transducer sensitive to rotation about an axis generally perpendicular to a plane thereof,
means for mounting said twist transducer on said other device in the path of a light beam with its axis parallel to the path of the light beam and on the second device,
and means for analyzing the change in polarity of the light beam due to rotation of said twist transducer.

* * * * *